Jan. 28, 1958  J. T. EFFORD ET AL  2,821,048
DISPENSING DEVICE
Filed July 6, 1955  2 Sheets-Sheet 1
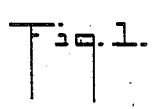
Fig.1.
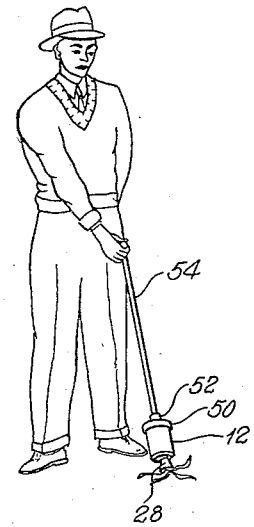
Fig.2.
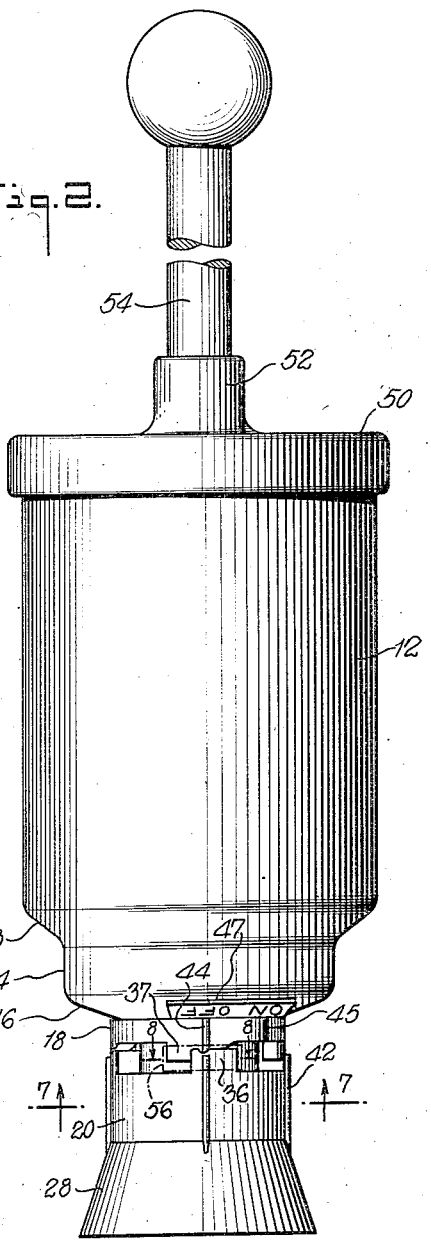
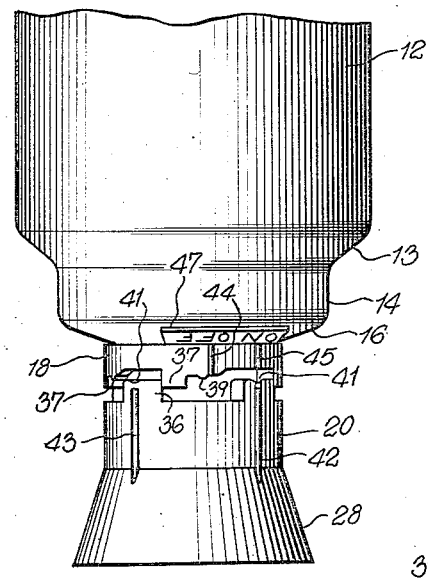
Fig.3.
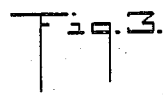
Fig.8.
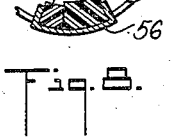
INVENTORS
JOHN T. EFFORD &
LESTER C. MORTON
BY
Kenyon & Kenyon
ATTORNEYS Jan. 28, 1958　　J. T. EFFORD ET AL　　2,821,048
DISPENSING DEVICE
Filed July 6, 1955　　　　　　　　　　2 Sheets-Sheet 2
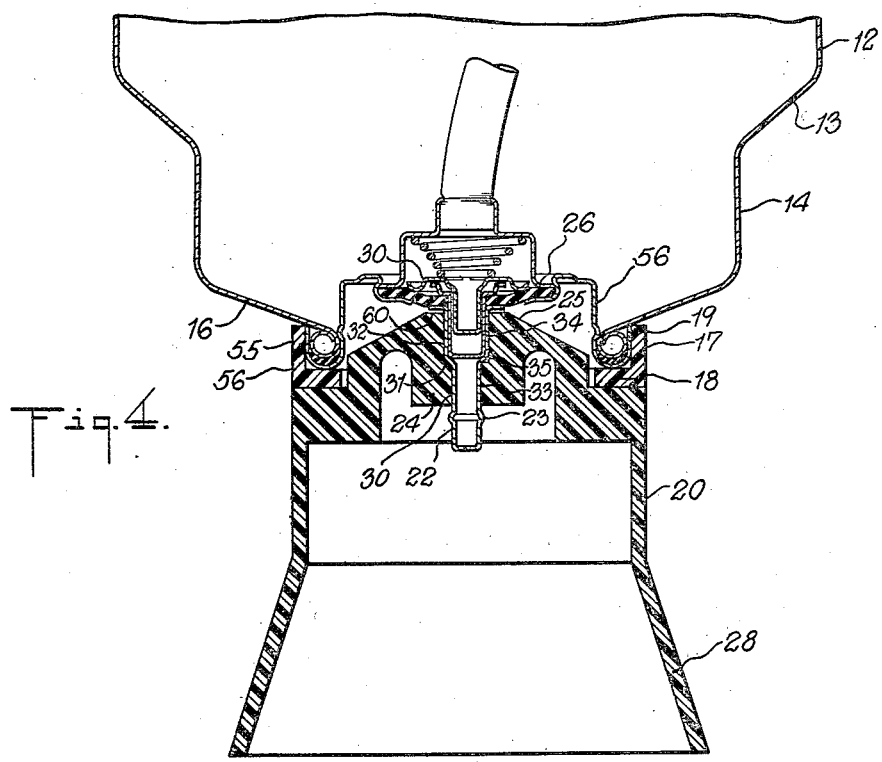
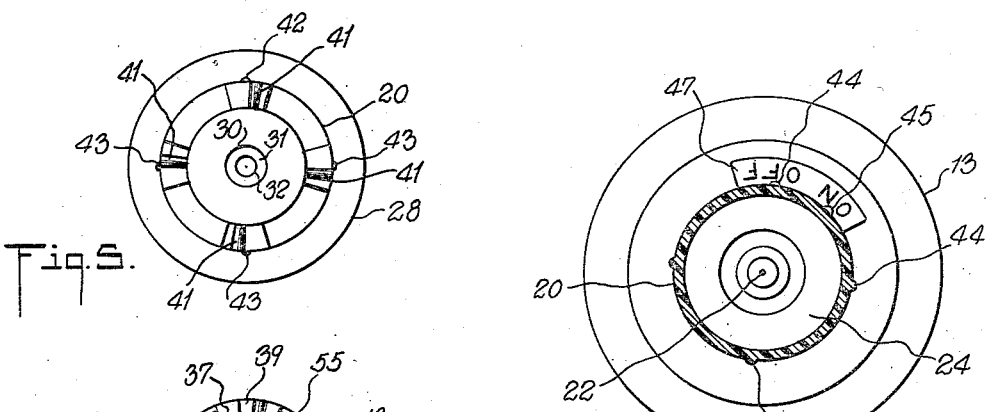
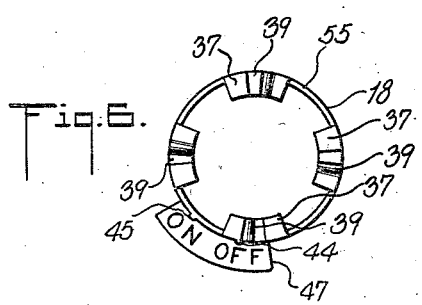
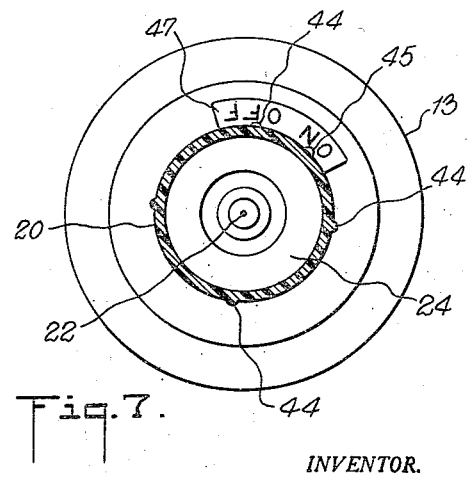
INVENTOR.
JOHN T. EFFORD &
LESTER C. MORTON
BY
Kenyon & Kenyon
ATTORNEYS

United States Patent Office 2,821,048
    Patented Jan. 28, 1958

2,821,048

DISPENSING DEVICE

John T. Efford, Stratford, and Lester C. Morton, Trumbull, Conn.

Application July 6, 1955, Serial No. 520,220

7 Claims. (Cl. 47—1)

This invention relates to improved means or apparatus for the distribution or dispersion of fluids as finely divided particles. More particularly, this invention pertains to a manually operated apparatus which is unusually effective as a weed killer.

In the application of insecticides, fumigants, weed killer or the like, it is the practice to disperse or distribute the same as a spray-like mist of finely divided particles. In such a practice, there is absent means by which the particular composition can be confined to a local area. In this respect, it may be desired in a cultivated plot of ground to direct insecticide or weed killer to a small area without affecting the surrounding space. Accordingly, there is great need, at present, for such an apparatus, and accordingly the present invention is directed towards this purpose or end.

An object of this invention is to provide an improved dispersing apparatus for use in directing an insecticide or weed killer to a confined area.

Another object of this invention is to provide a dispensing apparatus which can be handled manually with ease or with very little effort on the part of the operator.

Still another object of this invention is to provide a dispensing apparatus which will maintain the spray-like discharge in confinement in the desired area.

Other objects and advantages of this invention will become apparent from the following explanation and description thereof.

In accordance with the present invention, the dispensing apparatus is the combination of a dispensing valve assembly comprising a flexible diaphragm in operative valve association with an elongated nozzle such that a force applied to said diaphragm or nozzle results in breaking the seal therebetween, an enlarged collar positioned spatially from said nozzle, an actuator rotatably mounted on said elongated nozzle and also provided with an enlarged funnel or nozzle section which is in open communication therewith, and said actuator so constructed and arranged that in one position it engages with said collar thus placing the actuator in an inoperative position for actuating the valve and by rotation of the actuator to a second position the same is placed in an operative position for valve actuation.

In order to provide a full understanding of the present invention reference will be had to the accompanying drawings which form a part of this specification and wherein:

Fig. 1 is a sketch showing the use of the apparatus of this invention by means of an operator;

Fig. 2 is a diagrammatic sketch of the dispensing apparatus in the inoperative position;

Fig. 3 is a diagrammatic sketch showing the operative position of the actuator;

Fig. 4 is a cross-sectional view of the dispensing valve assembly;

Fig. 5 is an end view of the actuator element;

Fig. 6 is a top view of the collar member;

Fig. 7 is a view taken along lines 7—7 of Fig. 2; and

Fig. 8 is a cross-sectional view showing the lugs locked in position by means of a clip, along lines 8—8 in Fig. 2.

Fig. 4 is described in U. S. Patent 2,582,262 and the disclosure therein is hereby incorporated by reference.

The dispensing apparatus or device of this invention includes a receptacle or container 12 and it is adapted for receiving or holding under pressure a liquefied gas or any vaporizable liquid having included therewith the particular active ingredient, may it be an insecticide, fumigant, weed killer, etc. The container is generally cylindrical and it is made of metal and designed to withstand a pressure of the order of about 20 to about 70 p. s. i. g., although more usually the containers are designed to maintain a pressure not exceeding about 50 p. s. i. g. The container is, for example, about 6" in length, and has a diameter of about 3". In this particular embodiment one end of the container reduces in cross-sectional area to form a sloping shoulder 13, which joins container wall 14 of reduced diameter. Wall 14, in turn, joins a sloping top 16, in which there is mounted the dispensing valve assembly shown in Fig. 4. The collar 18 consists of a cylindrical section or part 55 having integrated in a lateral fashion lug and cam parts discussed hereinbelow. The collar member 18 is fixed to the top of container 12, by cementing the vertical side 17 to the flat portion 19 of eyelet 56. In this embodiment the collar is made of polyethylene, hence a suitable bonding agent or cement is sufficient for the contemplated service. The actuator 20 is in vertical alignment with collar 18 and rotatably mounted so as to be concentrically disposed with the elongated nozzle 22 of the valve assembly shown in Fig. 4.

As previously mentioned, the collar member 18 is designed to remain in a fixed position on the container whereas actuator 20 is rotatably mounted on nozzle 22. Consequently, the operator manipulates the actuator in order to effect the desired position of operation. The actuator 20 is prevented from sliding out of position by means of a boss or enlarged section 23 in nozzle 22. The sloping side or lower portion 25 of the actuator joins with the end 60 which is positioned adjacently to the diaphragm 26 but not in contact therewith. The end of the actuator 20 is circular in cross-section and it joins a hood 28. Actuator 20 contains an opening divided into two sections of different diameters, namely, openings 30 and 32 which form shoulder 31. The difference in size of openings is necessitated to accommodate the construction of the eyelets 33 and 34, which also have different diameters and form shoulder 35. With the application of a vertical force against actuator 20, shoulder 31 of the actuator presses against shoulder 35 of the eyelets and the depth of the sleeve-like member 24 is designed to prevent end 60 from contacting diaphragm 26. Collar member 18 and actuator 20 are each provided with four lugs 36 and 37. It should be understood, however, that each member can contain at least one lug and the number can vary to as many as practical. These lugs serve to restrict the rotation of actuator to two desired positions, viz. "off" and "on" as shown by indicator 47. Adjacent to lugs 37 of collar 18 are cams 39. In turn, lugs 36 of the actuator contain grooves 41 of suitable size for retaining cam 39 and thereby preventing sliding of the actuator from the desired inoperative position therein. Laterally disposed on the side of actuator 20 are three raised ribs 43 and indicator rib 42. On the other hand, collar member 18 contains two raised ribs 44 and 45, which correspond respectively to the "off" and "on" positions shown on indicator 47. When the actuator is in position to contact the diaphragm 26, raised ribs 42 and 45 are in alignment; whereas, when the actuator is in the "off" position or closed position the raised ribs 42 and 44 are in vertical alignment.

Another aid to the operator of the dispensing device is the "on" and "off" indicator 47 associated with or integrally a part of the collar member. The "on" and "off" indicator serves to indicate to the operator the direction in which the actuator should be rotated for a desired position. In this particular example, the actuator and collar member are made of polyethylene. However, it should be understood that other suitable types of resilient material can be employed such, for example, as Teflon, Kel-F, etc.

For the purpose of handling the container a resilient cap 50 made of the same material as the actuator or any other suitable material is associated or removably fits over the end of the container opposite to the position of the dispensing valve assembly. This removal cap 50 contains a section 52 of reduced cross-sectional area for receiving or holding a handle or pole 54. After all of the weed killer or propellant is consumed, the cap 50 is removed from the container and the latter is discarded.

When the actuator is placed in the "off" position, a clip 56 of the U shape shown in Fig. 8 can be used to hold lugs 36 and 37 together. This augments the cam action obtained by means of cams 39 and grooves 41.

In the operation of the dispensing mechanism, when it is desired to use the same, the actuator is rotated to the "on" position thereby providing that the actuator can be moved by the application of a direct vertical or coaxial force, or by a force directed at an angle displaced from the vertical axis. In effect, such forces cause eyelet 30 to unseat from the diaphragm with the result that propellant and active ingredients are discharged through nozzle 22 as a spray-like mist of finely divided particles. The flow of fluid is confined to a particular area by means of enlarged nozzle or hood 28 of actuator 20, and in the case of using the same for weed killing, the hood should be kept over the desired plant until the mist settles thereupon. For example, after the flow of fluid has stopped coming from the container, the hood or nozzle of actuator 20 is maintained in position over the desired area until the spray-like mist has completely or substantially settled. In this manner of operation there is little or no opportunity for the mist to settle upon the surrounding area. Hence, it can be seen that the hood or nozzle of the actuator is useful during the flow of fluid from the container as well as immediately thereafter for confining the mist or spray. When the pressure or force is released the valve assembly resumes the normal position and the operation may be repeated as often as there is material in the container. When it is desired to place the dispenser out of operation or in the "off" position, actuator 20 is rotated to the "off" position such that cams 39 fit into grooves 41 and thereby also bring lugs 36 and 37 together. As a means for insuring that actuator 20 will not slip out of position the locking clip described above can be used. Since the collar member 18 is made of polyethylene and it is resilient, it can be tightly fitted onto the container and thereby dispense with the use of cement to maintain the same in position.

It should be understood that the term "eyelet" as employed herein means a product of a machine involving a stamping and/or drawing operation. Therefore, the eyelets discussed hereinabove may consist of various shapes and may serve various functions.

Having thus provided a written description of this invention along with a specific example thereof, it should be understood that no undue limitation or restrictions are to be imposed by reason thereof, but that the scope of this invention is defined by the appended claims.

What is claimed is:

1. The combination of a container, a dispensing valve assembly mounted in the end of said container comprising a flexible diaphragm in operative association with an elongated nozzle such that a force applied to said nozzle results in the discharge of fluid therethrough, a collar mounted on said container and spaced from the said nozzle, said collar containing at least one lug integral with the end thereof and spaced from the container, an actuator rotatably mounted on said elongated nozzle and provided with an enlarged nozzle section in open communication with said elongated nozzle, said actuator containing at least one lug integrated laterally therewith and in alignment with the lug of said collar for engagement therewith, at least one cam and groove associated with the collar and actuator, said lugs, cams and grooves so constructed and arranged that in an engaged position the actuator is not operative and when disengaged the actuator is in an operative position, and a clip so arranged and constructed that the lugs of the actuator and collar are held in the said inoperative position.

2. The combination of a container adapted to contain a liquefied gas, a dispensing valve assembly associated with the container comprising a flexible diaphragm having an opening therein and a movable elongated nozzle projecting through said opening and in valve relation with said diaphragm, a collar fastened to said container and spaced from the elongated nozzle, an actuator rotatably mounted on the said elongated nozzle and having an enlarged nozzle portion in open communication with said nozzle for confining a spray-like mist which flows therefrom, said actuator arranged in relation to the nozzle such that a force applied to the actuator opens the valve thus causing spray-like mist to discharge therefrom, and said actuator so arranged and constructed that by rotation it engages with said collar thus placing the actuator in an inoperative position and when disengaged therefrom it places the actuator in an operative position.

3. The combination of a container, a dispensing valve assembly mounted in the end of said container comprising a flexible diaphragm having an opening therein and a movable elongated nozzle projecting through said opening and so arranged and constructed that one end is in valve relation with said diaphragm, a collar mounted on said container and positioned around the nozzle, said collar containing at least one lug and cam integral therewith, an actuator rotatably mounted on said elongated nozzle and provided with an enlarged nozzle section in open communication with said elongated nozzle, said actuator containing at least one lug and groove laterally integral therewith and so arranged and constructed that the cam engages the groove thereby placing the actuator in an inoperative position and by rotation disengaging the same thereby placing the actuator in an operative position.

4. The combination of a dispensing valve assembly comprising a flexible diaphragm in operative valve association with an elongated nozzle such that a force applied to said diaphragm or nozzle results in breaking the seal therebetween, an enlarged collar positioned spatially from said nozzle, an actuator rotatably mounted on said elongated nozzle and also provided with an enlarged nozzle section which is in open communication therewith, and said actuator being so constructed and arranged that in one position it engages the said collar thus placing the actuator in an inoperative position for actuation of the aforesaid valve and by rotation of the actuator to a second position the same is disengaged and placed in an operative position.

5. The apparatus of claim 4 wherein the nozzle section of the actuator is composed of resilient material.

6. The combination of a container, a flexible diaphragm in operative valve association with an elongated nozzle and associated with said container, operating means associated with said nozzle whereby in one position the aforesaid valve can be manually actuated to permit a spray-like mist to discharge from the said nozzle and whereby said discharge of fluid can be confined to a particular area and in another position said means is not in position for actuating said valve, and detachable elongated handle means adapted to grip the closed end of said container opposite said valve assembly and adapted for manual application of force to said operating means to actuate the said valve.

7. The combination of a container having associated therewith operative means whereby a spray-like mist of finely divided liquid particles may discharge from the container as a confined stream onto a desired area, a resilient cap member removably mounted on the closed end of said container and an elongated rod associated with said cap member and adapted for manual control of the container to the desired area remotely situated from the hand of the operator.

References Cited in the file of this patent

UNITED STATES PATENTS

| | | |
|---|---|---|
| 1,865,914 | Jaden | July 5, 1932 |
| 1,868,235 | Jaden | July 19, 1932 |
| 2,149,584 | Davis | Mar. 7, 1939 |
| 2,487,434 | Geiss | Nov. 8, 1949 |
| 2,537,377 | Soss | Jan. 9, 1951 |
| 2,659,918 | Stoner | Nov. 24, 1953 |
| 2,707,968 | Efford | May 10, 1955 |

FOREIGN PATENTS

| | | |
|---|---|---|
| 366,349 | Great Britain | Feb. 4, 1932 |

UNITED STATES PATENT OFFICE
CERTIFICATE OF CORRECTION

Patent No. 2,821,048                                                                January 28, 1958

John T. Efford et al.

It is hereby certified that error appears in the above numbered patent requiring correction and that the said Letters Patent should read as corrected below.

In the grant, lines 1 and 2, for "John T. Efford, of Stratford, and Lester C. Morton, of Trumbull, Connecticut," read -- John T. Efford, of Stratford, and Lester C. Morton, of Trumbull, Connecticut, assignors to Bridgeport Brass Company, of Bridgeport, Connecticut, a corporation of Connecticut,; line 11, for "John T. Efford and Lester C. Morton, their heirs" read -- Bridgeport Brass Company, its successors --; in the heading to the printed specification, lines 3 and 4, for "John T. Efford, Stratford, and Lester C. Morton, Trumbull, Conn., read -- John T. Efford, Stratford, and Lester C. Morton, Trumbull, Conn.-- assignors to Bridgeport Brass Company, Bridgeport, Conn., a corporation of Connecticut.

Signed and sealed this 29th day of April 1958.

(SEAL)
Attest:
KARL H. AXLINE

Attesting Officer

ROBERT C. WATSON
Commissioner of Patents